US011399320B2

(12) United States Patent
Vitzrabin et al.

(10) Patent No.: US 11,399,320 B2
(45) Date of Patent: Jul. 26, 2022

(54) METHODS OF CONNECTING TO COMMUNICATIONS NETWORKS AND SWITCHING NETWORK CONNECTIVITY

(71) Applicant: Blue Ocean Robotics Aps, Odense (DK)

(72) Inventors: Efraim Vitzrabin, Odense (DK); John Erland Østergaard, Odense (DK)

(73) Assignee: Blue Ocean Robotics ApS, Odense (DK)

(*) Notice: Subject to any disclaimer, the term of this patent is extended or adjusted under 35 U.S.C. 154(b) by 24 days.

(21) Appl. No.: 16/983,911

(22) Filed: Aug. 3, 2020

(65) Prior Publication Data
US 2022/0038966 A1 Feb. 3, 2022

(51) Int. Cl.
*H04W 36/00* (2009.01)
*H04W 36/22* (2009.01)
*H04W 40/28* (2009.01)

(52) U.S. Cl.
CPC . *H04W 36/0072* (2013.01); *H04W 36/00835* (2018.08); *H04W 36/00837* (2018.08); *H04W 36/22* (2013.01); *H04W 40/28* (2013.01)

(58) Field of Classification Search
CPC ....... H04W 36/0072; H04W 36/00837; H04W 36/22; H04W 36/00835; H04W 40/28
(Continued)

(56) References Cited

U.S. PATENT DOCUMENTS 7,623,654 B2 * 11/2009 Tischer ................. H04M 1/725
379/219
9,295,022 B2 * 3/2016 Bevan ................. H04W 52/283
(Continued)

FOREIGN PATENT DOCUMENTS

CN 102231233 A 11/2011
CN 102711199 A 10/2012
(Continued)

OTHER PUBLICATIONS

Taiwanese Office Action for App. No. TW109126937, dated Aug. 19, 2021, 5 pages.
(Continued)

*Primary Examiner* — Inder P Mehra
(74) *Attorney, Agent, or Firm* — Kevin T. Roddy; Butzel Long (57) ABSTRACT

Implementations of the disclosed subject matter provide a method of connecting, via a communications interface of an autonomous mobile device, to both a first communication network and a second communication network. A third communication network may be connected to when the communications interface is disconnected. A map may be stored that includes a first one or more locations of the autonomous mobile device where the plurality of communications networks are accessible, and includes a second one or more locations of the autonomous mobile device where one or more of the plurality of communications networks have been disconnected. At a different time, when the autonomous mobile device is within a predetermined distance of one of the locations that the communications networks have been disconnected, the third communications network or another one of the plurality of communications networks may be switched to based on the map.

30 Claims, 10 Drawing Sheets

(58) Field of Classification Search
USPC .......................................................... 455/437
See application file for complete search history.

(56) References Cited

U.S. PATENT DOCUMENTS

| | | | |
|---|---|---|---|
| 9,307,568 B2 | 4/2016 | Gassend | |
| 9,320,074 B2 | 4/2016 | Gassend | |
| 9,320,076 B2 | 4/2016 | Gassend | |
| 9,344,935 B2 | 5/2016 | Hassan | |
| 9,730,258 B2 | 8/2017 | Davydov | |
| 10,582,488 B2* | 3/2020 | Morioka | H04L 5/003 |
| 2007/0100541 A1* | 5/2007 | Kong | G01C 21/26 701/408 |
| 2007/0142050 A1 | 6/2007 | Handforth | |
| 2009/0191878 A1 | 7/2009 | Hedqvist | |
| 2012/0302271 A1* | 11/2012 | Stewart | H02J 13/0075 455/507 |
| 2013/0294230 A1* | 11/2013 | Popa | H04L 47/743 370/230 |
| 2015/0036657 A1 | 2/2015 | Hong | |
| 2015/0197010 A1 | 7/2015 | Ruuspakka | |
| 2016/0174117 A1* | 6/2016 | Wong | H04W 36/04 455/444 |
| 2019/0182727 A1 | 6/2019 | Hassan | |
| 2019/0191483 A1* | 6/2019 | Ryoo | H04W 76/27 |
| 2019/0215482 A1* | 7/2019 | Sathya | G06K 9/00248 |
| 2020/0059821 A1* | 2/2020 | Wirth | H04L 1/1851 |
| 2020/0080865 A1* | 3/2020 | Ervin | G01C 21/20 |
| 2020/0319652 A1* | 10/2020 | Kang | G06T 7/20 |
| 2021/0041884 A1* | 2/2021 | Tian | G05D 1/0231 |
| 2021/0097728 A1* | 4/2021 | Matlack | G01C 21/3438 |
| 2021/0144560 A1* | 5/2021 | Sesia | H04W 72/0453 |

FOREIGN PATENT DOCUMENTS

| | | |
|---|---|---|
| CN | 105466421 A | 4/2016 |
| CN | 109495949 A | 3/2019 |
| JP | 2019148870 A | 9/2019 |
| JP | 2019165374 A | 9/2019 |
| TW | I602405 B | 10/2017 |

OTHER PUBLICATIONS

Extended European Search Report for App. No. EP20190253.3, dated Jan. 28, 2021, 7 pages.
Taiwanese Office Action and Search Report for App. No. TW109126937, dated Mar. 29, 2021, 12 pages.

* cited by examiner

METHODS OF CONNECTING TO
COMMUNICATIONS NETWORKS AND
SWITCHING NETWORK CONNECTIVITY

BACKGROUND

Mobile devices, such as mobile robots, are typically connected to a single communications network while being operated or controlled by a remote device. Data is transmitted between the mobile device and the remote device via the single communications network. When the mobile device becomes disconnected from the communications network, the mobile device typically searches for another communications network to connect to.

BRIEF SUMMARY

According to an implementation of the disclosed subject matter, a method may include connecting, via a communications interface of an autonomous mobile device, to both a first communication network and a second communication network of a plurality of communication networks. A third communication network may be connected to when the communications interface is disconnected from one of the first communications network and the second communications network. The method may include storing, at a memory device communicatively coupled to the communications interface, a map that includes a first one or more locations of the autonomous mobile device where the plurality of communications networks are accessible, and includes a second one or more locations of the autonomous mobile device where one or more of the plurality of communications networks have been disconnected. At a different time, when the autonomous mobile device is within a predetermined distance of one of the second one or more locations that the plurality of communications networks have been disconnected, the third communications network or another one of the plurality of communications networks may be switched to based on the map.

Additional features, advantages, and implementations of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Implementations of the disclosed subject matter may provide an autonomous mobile device, such as a mobile robot, that may be communicatively connected to a plurality of different access points and/or communications networks at the same time. The connection of the autonomous mobile device to the plurality of networks (e.g., two networks, three networks, or the like) may increase the available bandwidth for the autonomous mobile device. For video communications (e.g., video communications from the autonomous mobile device to a remote computer), having a plurality of network connections may increase the frames per second (FPS) of the video stream. When a connection to one of the plurality of networks is interrupted and/or disconnected, the FPS rate of the video stream may be reduced to the FPS for a single network until another network connection may be made to increase bandwidth.

In implementations of the disclosed subject matter, the autonomous mobile device may connect to a first communications network and a second communications network. When one of the networks is disconnected, the autonomous mobile device may use information from a map to determine a third communications network or another one of a plurality of communications networks to connect to. The map may provide areas where disconnections may occur with one or more networks, and/or what areas may provide one or more communications network connections. When the autonomous mobile device is disconnected from and/or connects to one of the plurality of communications networks, the area of disconnection and/or connection may be stored on the map.

At a different time, when the autonomous mobile device approaches the same area where a disconnection occurred and/or a connection to another communications network was made, the autonomous mobile device may connect to the same network previously connected to before experiencing a disconnection, based on the map.

In some implementations, if the autonomous mobile device takes a similar path as taken before, the autonomous mobile device may use map information and/or sensor information to predict areas to change connections to a communications network before experiencing a disconnection from one or more communications networks. The network that is changed to may not have the highest signal strength of available networks, but may last longer relative to a given path that the autonomous mobile device is planning to operate in. This may minimize the number of network switches.

In some implementations, the autonomous mobile device may adjust a speed of movement in an area when switching connections to a communications network to minimize and/or avoid latencies.

Implementations of the disclosed subject matter may provide communications (e.g., video, text, data, and the like) from the autonomous mobile device to one or more remote devices, where communications may continue when there is a disconnection of one of the plurality of networks that the autonomous mobile device is connected to.

In some implementations, the autonomous mobile device may select a different communications network, based on a task of the autonomous mobile device. For example, the mobile device may operate autonomously with a reduced communications signal strength (e.g., which may not be able to transmit video). In another example, the mobile device may operate autonomously, and may transmit data, video, text, or the like. In this example, the path of the mobile device may be chosen based on communications network coverage for one or more areas.

In some implementations, the mobile device may operate in a manual mode, where the path of the robot may be estimated based on prior user history with the mobile device (e.g., where the user may control the operation of the mobile device from a remote device).

The autonomous mobile device may operate so as to minimize and/or avoid being disconnected from communications networks (i.e., where there are no communications signals).

The autonomous mobile device may connect to one or more communications networks based on information of a stored map. When the mobile device operates in an area where no signal is available from a communications network, and the mobile device is operating in an autonomous mode, it may continue to operate. If the mobile device is operating in a telepresence mode, the mobile device may follow a person for a predetermined period of time, and output a notification that there is no connection to a communications network. If there is no connection for a period that is longer than the predetermined period of time, the mobile device may move to the last known place where a communications network was available.

Figure 1:
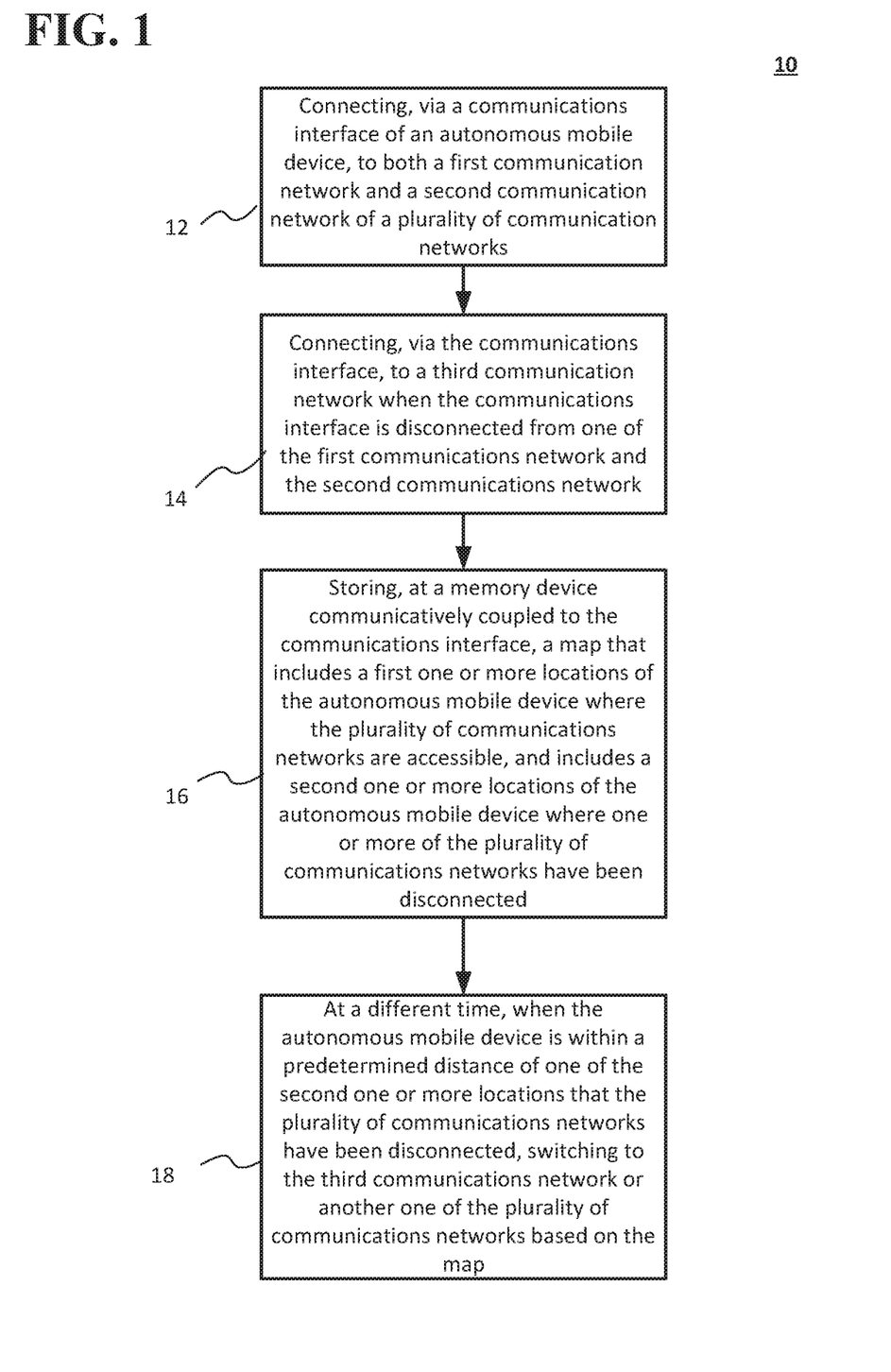
FIG. 1 shows an example method of connecting to communication networks with an autonomous mobile device, and switching to other communications networks based on a stored map of accessible communications networks when there is a disconnection according to an implementation of the disclosed subject matter.

FIG. 1 shows an example method 10 of connecting to communication networks with an autonomous mobile device, and switching to other communications networks based on a stored map of accessible communications networks when there is a disconnection according to an implementation of the disclosed subject matter.

Figure 6:
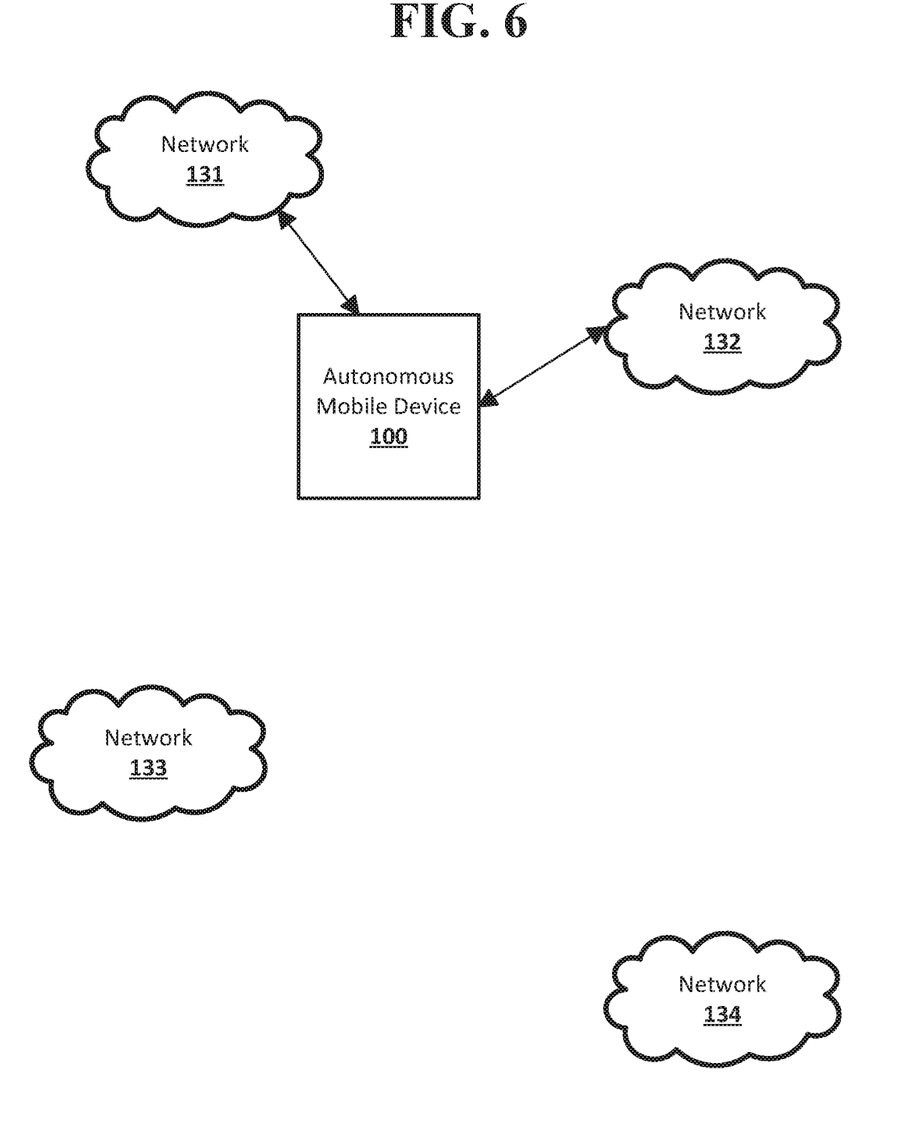
FIGS. 6-7 show the autonomous mobile device connecting to different communications networks in the example method of FIG. 1 according to implementations of the disclosed subject matter.
Figure 7:
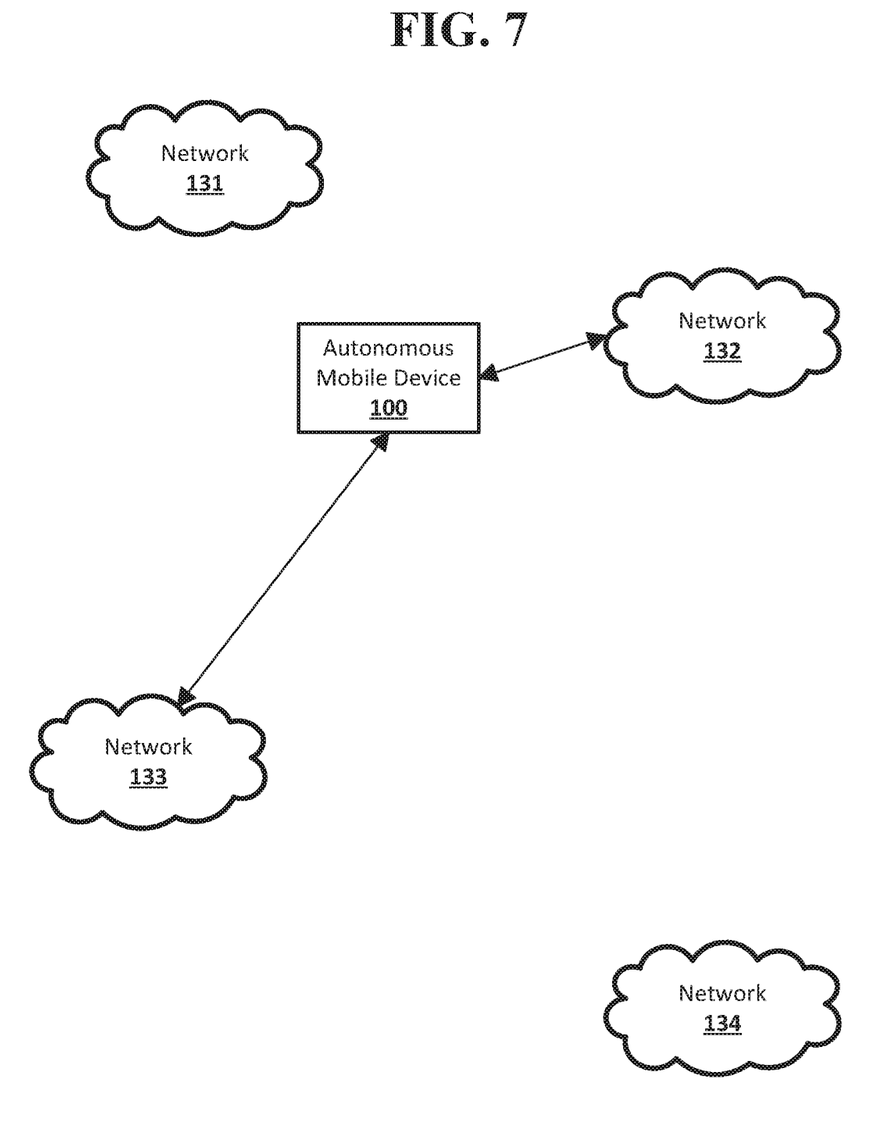
Figure 10:
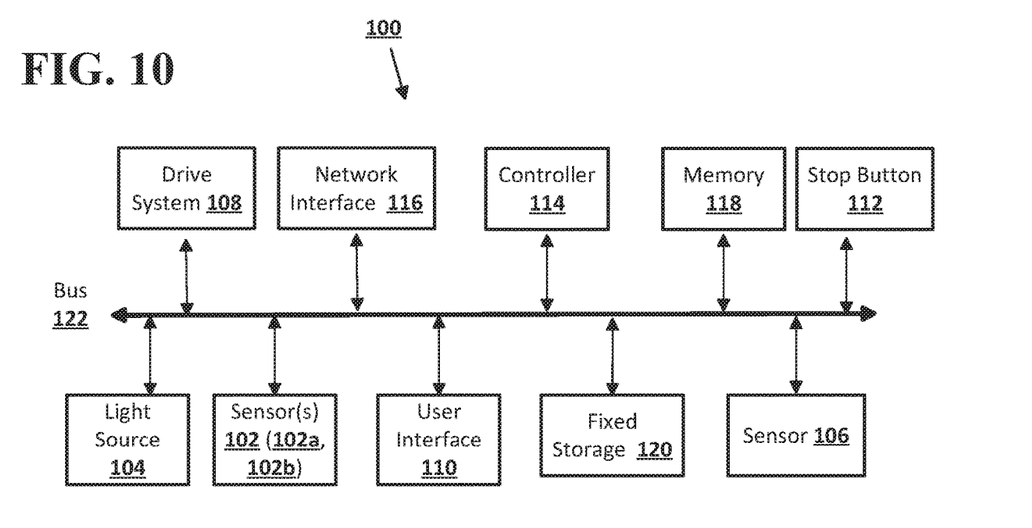
FIG. 10 shows an example configuration of the autonomous mobile device of FIGS. 8-9 according to an implementation of the disclosed subject matter.
Figure 11:
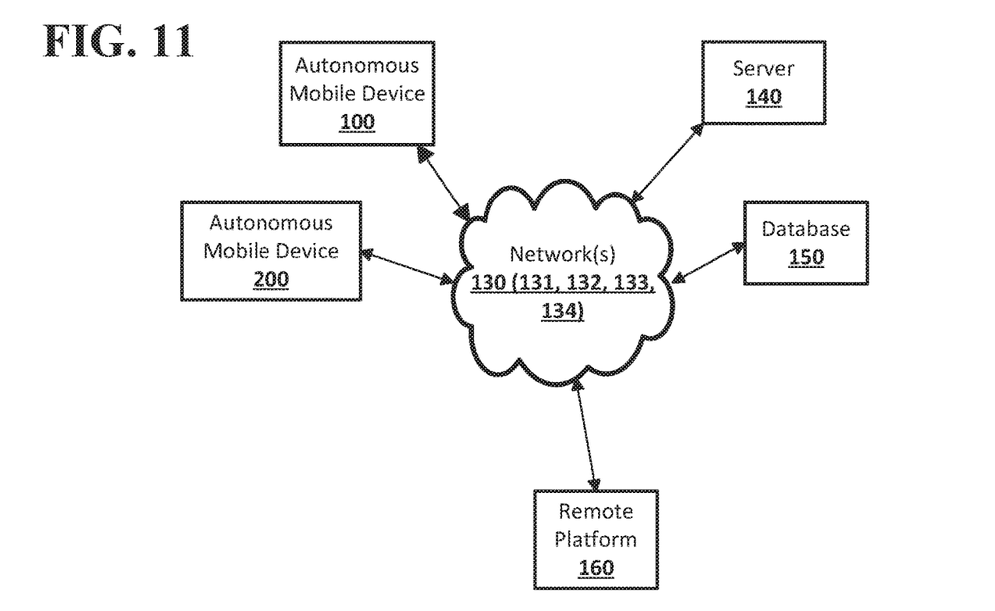
FIG. 11 shows a network configuration which may include a plurality of autonomous mobile devices according to implementations of the disclosed subject matter.

At operation 12, a communications interface (e.g., network interface 116 shown in FIG. 10) of an autonomous mobile device (e.g., autonomous mobile device 100, shown in FIGS. 6-11), may be connected to both a first communication network (e.g., network 131 shown in FIGS. 6-7 and 11) a second communication network (e.g., network 132 shown in FIGS. 6-7 and 11) of a plurality of communication networks (e.g., network 131, 132, 133, and/or 134 shown in FIGS. 6-7 and 11, where network 130 may include one or more of networks 131, 132, 133, and/or 134). For example, as shown in FIG. 6, the autonomous mobile device 100 may be connected to networks 131 and 132. Although FIG. 6 shows that the autonomous mobile device 100 is connected to two networks, in some implementations the autonomous mobile device 100 may be connected to more than two networks.

At operation 14, the communications interface of the autonomous mobile device may connect to a third communication network (e.g., network 133 shown in FIGS. 6-7 and 11) when the communications interface is disconnected from the first communications network (e.g., network 131 shown in FIGS. 6-7) and/or the second communications network (e.g., network 132 shown in FIGS. 6-7. For example, as shown in FIG. 7, the autonomous mobile device 100 may be disconnected from network 131, and may connect to network 133 using the communications interface (e.g., network interface 116 shown in FIG. 10).

In some implementations, the communications interface may connect to one of the plurality of communications networks (e.g., network 133 and/or 134 shown in FIGS. 6-7 and 11) when one of the first communication networks (e.g., network 131) or the second communication networks (e.g., network 132) has a use rate that is greater than a predetermined use amount. The predetermined use amount may include, for example, the amount of time connected to the network, the amount of data transmitted while connected to the network, the frequency of receiving and/or transmitting data via the network, or the like.

At operation 16, a memory device communicatively coupled to the communications interface may store a map that includes a first one or more locations of the autonomous mobile device where the plurality of communications networks are accessible. The memory device may be memory 118 and/or fixed storage 120 of the autonomous mobile device 100 shown in FIG. 10, and/or server 140, database 150, and/or remote platform 160 shown in FIG. 11. The stored map may include a second one or more locations of the autonomous mobile device where one or more of the plurality of communications networks have been disconnected. That is, the map may include locations where one or more networks are accessible (i.e., the first locations), and/or where one or more disconnections between the autonomous mobile device and one or more networks have occurred (i.e., the second locations).

At a different time, when the autonomous mobile device is within a predetermined distance of one of the second one or more locations that the plurality of communications networks have been disconnected, the third communications network (e.g., network 133 shown in FIGS. 6, 7, and 11) or another one of the plurality of communications networks (e.g., network 134 shown in FIGS. 6, 7, and 11) may be switched to in operation 18, based on the map. The switching may include connecting to the third communications network (e.g., network 133 shown in FIGS. 6, 7, and 11) or the other one of the plurality of communications networks (e.g., network 134 shown in FIGS. 6, 7, and 11) based on the map, and based on at least one signal from one or more sensors (e.g., 102, 102a, 102b, 106 shown in FIGS. 8-10) of the autonomous mobile device to determine a location of the autonomous mobile device.

In some implementations, operation 18 may include selecting the third communications network and/or another one of the plurality of communications networks based on an available duration of signal time, regardless of signal strength. The duration of signal time may include the amount of time that a network may be available to the autonomous mobile device based on a route of the autonomous mobile device. The selection of the third communications network and/or another one of the plurality of communications networks may be based on minimizing the switching between the plurality of communication networks.

In some implementations, operation 18 may include switching to the third communications network (e.g., network 133 shown in FIGS. 6, 7, and 11) or the other one of the plurality of communications networks (e.g., networks 131, 132, 134 shown in FIGS. 6, 7, and 11) that provide a longer connection time based on a planned path of the autonomous mobile device. That is, the autonomous mobile device may switch to the network that may be available for the longest time, based on the path of the autonomous mobile device. A controller (e.g., controller 114 shown in FIG. 10) of the autonomous mobile device may predict the planned path based on a user of the autonomous mobile device. The user of the autonomous mobile device may communicate and/or control the autonomous mobile device via the communications interface (e.g., the network interface 116 of FIG. 10) with a remote device (e.g., remote platform 160 shown in FIG. 11). The autonomous mobile device may store (e.g., in memory 118 and/or fixed storage 120) and/or retrieve (e.g., from server 140 and/or database 150 shown in FIG. 11) previous routes planned by the user to predict the current planned path for the autonomous mobile device.

The autonomous mobile device may switch to the third communications network (e.g., network 133 shown in FIGS. 6, 7, and 11) or another one of the plurality of communications networks (e.g., network 134 shown in FIGS. 6, 7, and 11) when the first communication network (e.g., network 131 shown in FIGS. 6, 7, and 11) and/or the second communication network (e.g., network 132 shown in FIGS. 6, 7, and 11) has a network load that is greater than a predetermined threshold network load. For example, the network load may include the number of devices connected to the network, the amount of data transmissions for a period of time, or the like. The autonomous mobile device may switch networks when the load of a network that the mobile device is connected to exceeds a threshold network load.

In some implementations, the autonomous mobile device may switch to a low priority network (e.g., network 134 shown in FIGS. 6, 7, and 11) from among the plurality of communications networks (e.g., networks 131, 132, 133 shown in FIGS. 6, 7, and 11) based on a classification of the autonomous mobile device. For example, the autonomous mobile devices (e.g., mobile devices 100, 200 or the like shown in FIG. 11) and/or other devices communicatively coupled to a network may be classified in terms of importance of network access. That is, one or more devices may have priority to transmit and/or receive communications via the network. The low priority network may transmit data at a lower predetermined rate than other communications networks of the plurality of communications networks.

A bandwidth for the autonomous mobile device may be reduced by the first communication network (e.g., network 131 shown in FIGS. 6-7), the second communication network (e.g., network 132 shown in FIGS. 6-7), and/or the third communication network (e.g., network 133 shown in FIGS. 6-7) that the autonomous mobile device is connected to. The bandwidth reduction may be based on the use of the first communication network, the second communication network, and/or the third communication network by other devices. That is, if devices such as the autonomous mobile device 200 (shown in FIG. 11), other autonomous mobile devices, the remote platform 160 (shown in FIG. 11), or the like are using one or more of the communications networks that the autonomous mobile device is connected to, the bandwidth of that network may be reduced for the autonomous mobile device.

In some implementations, the example method 10 may include switching to the first communication network (e.g., network 131 shown in FIGS. 6, 7, and 11), the second communication network (e.g., network 132 shown in FIGS. 6, 7, and 11), and/or the third communication network (e.g., network 133 shown in FIGS. 6, 7, and 11) when a network that the autonomous mobile device is connected to has a predetermined usage by other devices. The usage may include the number of devices connected to the network, the amount of data transmissions for a period of time, or the like. A route of the autonomous mobile device may be dynamically changed based on a change to the map for a connectivity for one of the plurality of communication networks (e.g., network 131, 132, 133, 134 shown in FIGS. 6, 7, and 11).

In some implementations, the method 10 may include storing a disconnection point of the first communications network (e.g., network 131) and/or the second communications network (e.g., network 132) on the map. A connection point of the third communications network (e.g., network 133) and/or another one of the plurality of communications networks (e.g., network 134) may be stored on the map. The map may be stored in memory 118 and/or fixed storage 120 of the autonomous mobile device 100 shown in FIG. 10, and/or may be stored at the server 140, database 150, and/or remote platform 160 that may be communicatively coupled to the autonomous mobile device 100 via network 130 (e.g., which may include one or more of the networks 131, 132, 133, and/or 134).

A rate of speed of the autonomous mobile device may be adjusted (e.g., by controller 114) within a predetermined distance of the locations that one or more of the plurality of communications networks have been disconnected, or within a switching area. A switching area may be an area where the autonomous mobile robot device switches a connection from one communications network to another (e.g., from network 131 to network 133, as shown in FIGS. 6-7). The communications interface (e.g., network interface 116 shown in FIG. 10) of the autonomous mobile device may switch to the third communications network (e.g., network 133 as shown in FIGS. 6-7) or another one of the plurality of communications networks (e.g., network 134 as shown in FIGS. 6-7). In some implementations, a controller (e.g., controller 114 shown in FIG. 10) of the autonomous mobile device may control the movement of the mobile device according to the map. For example, the controller 114 may control the drive system 108 shown in FIG. 10 to control the movement of the autonomous mobile device 100 based on the map. In some implementations, the controller may control the autonomous mobile device based on a signal received from at least one sensor (e.g., sensor 102, 102a, 102b, and/or sensor 106 shown in FIGS. of the autonomous mobile device.

In some implementations, the communications interface (e.g., network interface 116 shown in FIG. 10) may transmit at a reduced rate when the communications interface is disconnected from the first communications network (e.g., network 131 shown in FIGS. 6-7) and/or the second communications network (e.g., network 132 shown in FIGS. 6-7). For example, when the communications interface of the autonomous mobile device is disconnected from the first communications network, the communications interface may transmit data, images, video, or the like at a reduced rate, as the autonomous mobile device is connected to one communications network, rather than a plurality of communications networks.

Figure 2:
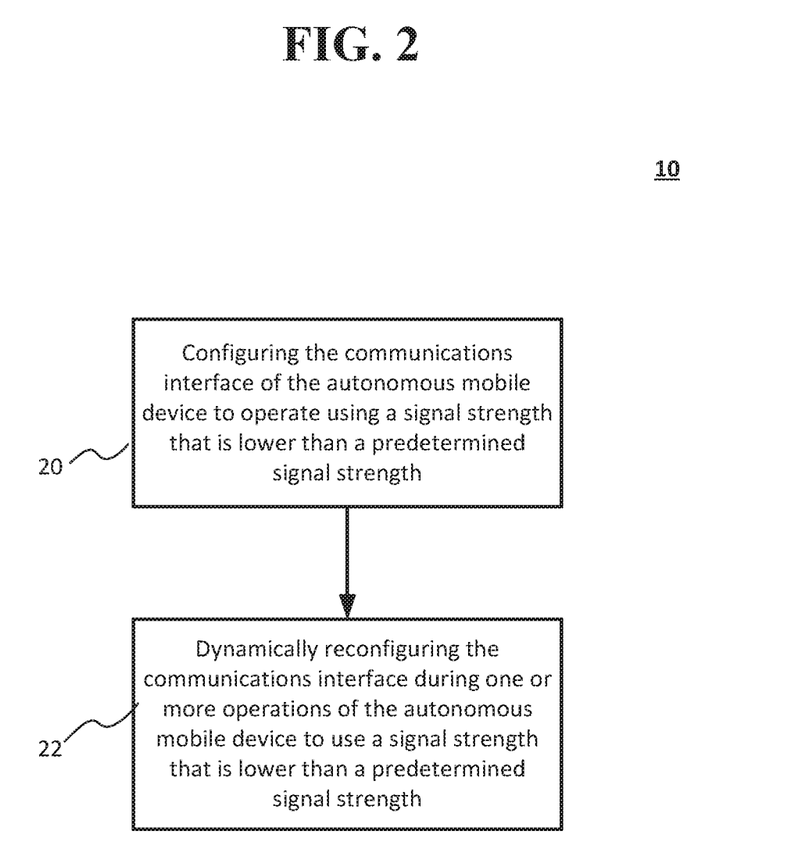
FIG. 2 shows that the example method of FIG. 1 may include configuring the communications interface of the autonomous mobile device to operate using a signal strength that is lower than a predetermined signal strength according to an implementation of the disclosed subject matter.

FIG. 2 shows that the example method 10 of FIG. 1 may include configuring the communications interface (e.g., network interface 116 shown in FIG. 10) of the autonomous mobile device (e.g., autonomous mobile device 100 shown in FIGS. 8-11). At operation 20, the communications interface of the autonomous mobile device may be configured to operate using a signal strength that is lower than a predetermined signal strength. At operation 22, the communications interface may be dynamically reconfigured during one or more operations of the autonomous mobile device to use a signal strength that is lower than a predetermined signal strength. That is, the autonomous mobile device may configure and/or reconfigure the communications interface so as to maintain a connection with the communications network, even when it has a reduced signal strength, so as to minimize network switching.

Figure 3:
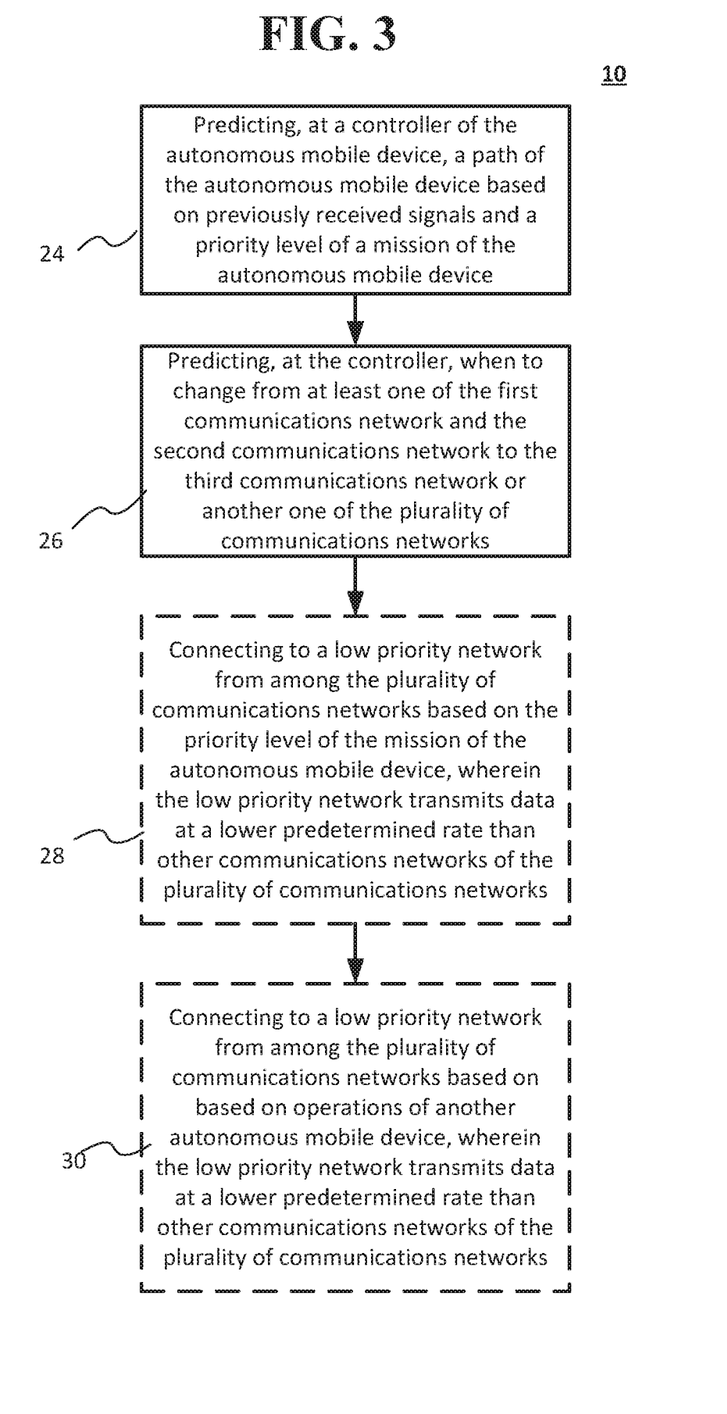
FIG. 3 shows that the example method of FIG. 1 may include predicting when to change to another one of the plurality of communications networks according to an implementation of the disclosed subject matter.

FIG. 3 shows that the example method 10 of FIG. 1 may include predicting when to change communications networks according to an implementation of the disclosed subject matter.

At operation 24, a controller (e.g., controller 114 shown in FIG. 10) of the autonomous mobile device may predict a path of the autonomous mobile device based on previously received signals and a priority level of a mission of the autonomous mobile device. For example, the priority level of the mission may be received by the autonomous mobile device from the server 140, the database 150, and/or the remote platform 160 via the network 130 (which may include one or more of networks 131, 132, 133, and/or 134). In this example, higher priority missions may have a different path (e.g., which minimizes network switching) from lower priority missions. The path may be selected based on the map, which may include signal strength, available networks in different areas, and areas where networks may be disconnected.

At operation 26, the controller may predict when to change from at least one of the first communications network (e.g., network 131) and the second communications network (e.g. network 132) to the third communications network (e.g., network 133) or another one of the plurality of communications networks (e.g., network 134). In some implementations, the controller may use the stored map to predict when to change networks. In some implementations, the controller may predict when to switch networks based on reduction of signal strength of the first communications network and/or the second communications network.

Optionally, at operation 28, the example method 10 may include connecting the autonomous mobile device to a low priority network from among the plurality of communications networks (e.g., networks 131, 132, 133, 134) based on the priority level of the mission of the autonomous mobile device. In some implementations, the priority level of the mission may be received by the autonomous mobile device via network 130 (e.g., which may include one or more of networks 131, 132, 133, and/or 134) from the server 140 and/or the remote platform 160, as shown in FIG. 11. The low priority network may transmit data at a lower predetermined rate than other communications networks of the plurality of communications networks. Operation 30 may optionally connect the autonomous mobile device to a low priority network from among the plurality of communications networks based on based on operations of another autonomous mobile device (e.g., autonomous mobile device 200 shown in FIG. 11).

In some implementations, the autonomous mobile device may be operated without signals received by the communications interface (e.g., network interface 116 shown in FIG. 10) when the communications interface is disconnected from the plurality of communication networks (e.g., networks 131, 132, 133, 134 shown in FIGS. 6-7).

Figure 4:
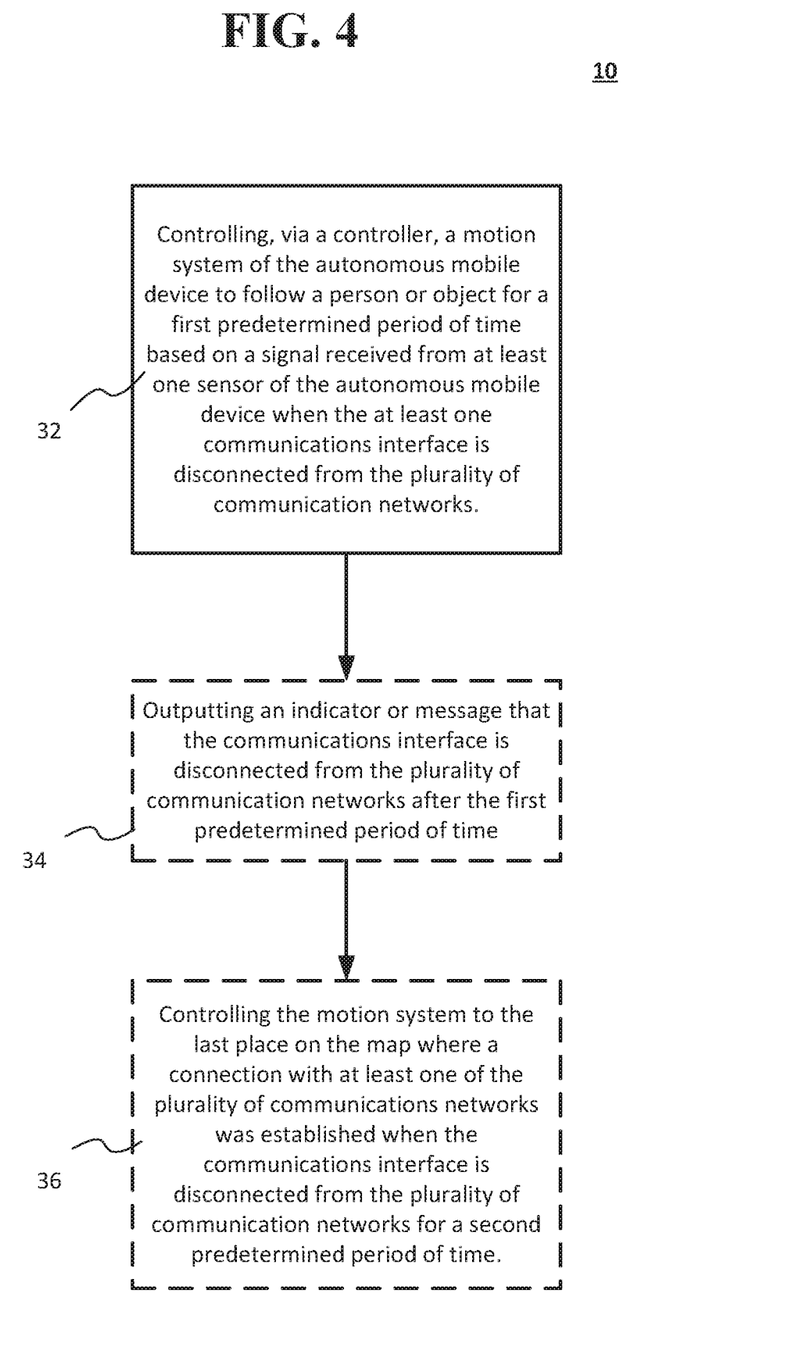
FIG. 4 shows that the example method of FIG. 1 may include a motion system of the autonomous mobile device to follow a person or object when the communications interface is disconnected from the plurality of communication networks according to an implementation of the disclosed subject matter.

FIG. 4 shows that the example method 10 of FIG. 1 may include a motion system of the autonomous mobile device to follow a person or object when the communications interface is disconnected from the plurality of communication networks according to an implementation of the disclosed subject matter.

At operation 32 a controller (e.g., controller 114 shown in FIG. 10) may control a motion system (e.g., drive system 108 shown in FIG. 10) of the autonomous mobile device to follow a person or object for a first predetermined period of time based on a signal received from at least one sensor (e.g., sensor 102, 102a, 102b, and/or 106 shown in FIGS. 8-10) of the autonomous mobile device. Operation 32 may be performed when the communications interface (e.g., network interface 116 shown in FIG. 10) is disconnected from the plurality of communication networks.

Optionally, at operation 34, the autonomous mobile device may output an indicator or message that the communications interface is disconnected from the plurality of communication networks after the first predetermined period of time. For example, the autonomous mobile device may output an audible message via a speaker that is part of the user interface 110 shown in FIG. 10 that the interface has been disconnected from the communications networks. In another example, the autonomous mobile device may display a message on a display of the user interface 110 that the interface has been disconnected from the communications networks.

Optionally, at operation 36, a controller (e.g., controller 114 shown in FIG. 10) may control the motion system (e.g., drive system 108 shown in FIG. 10) of the autonomous mobile device to the last place on the map where a connection with at least one of the plurality of communications networks (e.g., networks 131, 132, 133, 134) was established when the communications interface is disconnected from the plurality of communication networks for a second predetermined period of time.

Figure 5:
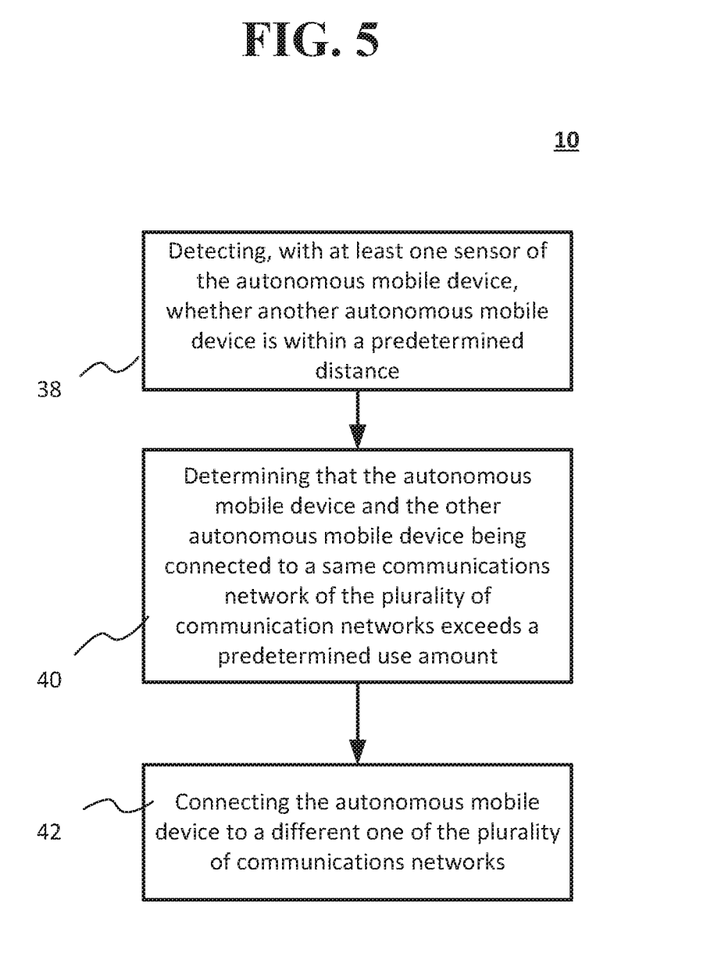
FIG. 5 shows that the example method of FIG. 1 may include connecting the autonomous mobile device to a different one of the plurality of communications networks when another autonomous mobile device is connected to the same network according to an implementation of the disclosed subject matter.

FIG. 5 shows that the example method 10 of FIG. 1 may include connecting the autonomous mobile device to a different one of the plurality of communications networks when another autonomous mobile device is connected to the same network according to an implementation of the disclosed subject matter. At operation 38, the autonomous mobile device may use at least one sensor (e.g., sensor 102, 102a, 102b, 106) to determine if another autonomous mobile device is within a predetermined distance. At operation 40, the autonomous mobile device may determine that it and the other autonomous mobile device being connected to a same communications network of the plurality of communication networks exceeds a predetermined use amount. At operation 42, the communications interface may connect the autonomous mobile device to a different one of the plurality of communications networks.

In some implementations of the example method 10, when at least one sensor (e.g., sensor 102, 102a, 102b, 106) of the autonomous mobile device detects another autonomous mobile device (e.g., autonomous mobile device 200 shown in FIG. 11) within the predetermined distance, at least a portion of the map may be transmitted via the at least one of the plurality of communications networks (e.g., networks 131, 132, 133, 134) to the other autonomous mobile device. The at least a portion of the map may include geographical information, one or more areas that the plurality of communications networks have been disconnected, one or more areas where one or more of the plurality of communications networks have reduced bandwidth, and/or one or more areas where a rate of speed of the autonomous mobile device is to be adjusted.

The communications interface (e.g., network interface 116) may receive data from another autonomous mobile device (e.g., autonomous mobile device 200 shown in FIG. 11) to be added to the map when at least one sensor of the autonomous mobile device detects the other autonomous mobile device within a predetermined distance. The data may include geographical information, one or more locations that the plurality of communications networks have been disconnected, one or more locations where one or more of the plurality of communications networks have reduced bandwidth, and/or one or more locations where a rate of speed of the autonomous mobile device is to be adjusted.

Figure 8:
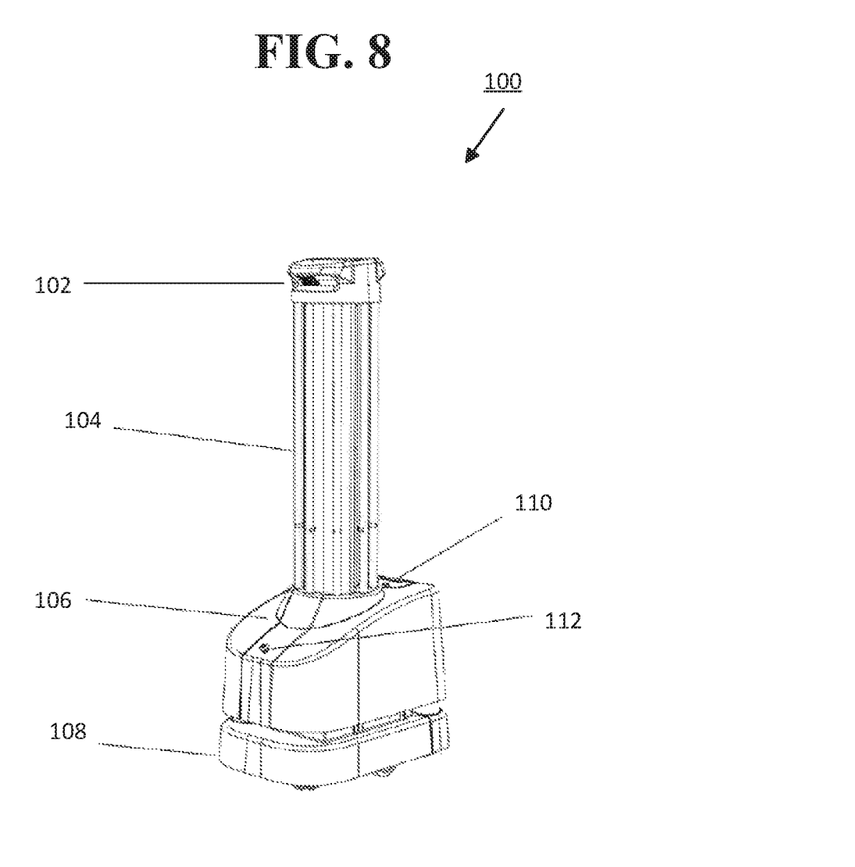
FIGS. 8-9 show a plurality of external views of the autonomous mobile device according to implementations of the disclosed subject matter.
Figure 9:
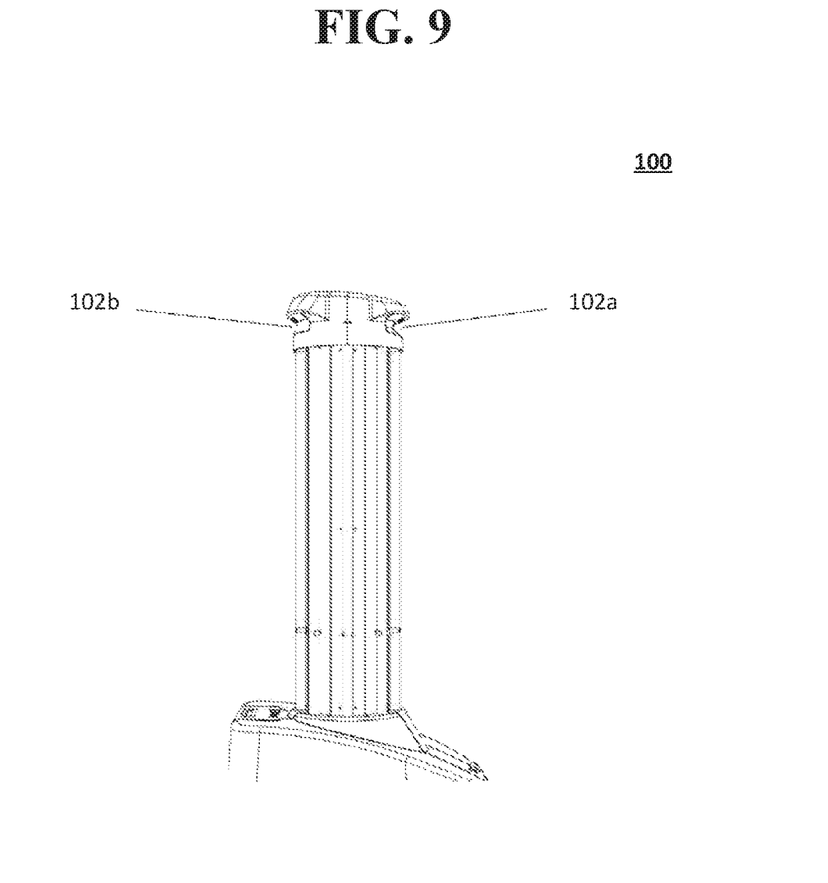

FIGS. 8-9 show a plurality of external views of an autonomous mobile device 100 according to implementations of the disclosed subject matter. In some implementations, the autonomous mobile device may be used to disinfect surfaces and/or areas, using a light source to output ultraviolet (UV) light. The autonomous mobile device 100 may include at least a first sensor 102 (shown as sensor 102a and 102b in FIG. 9), a light source 104 to output ultraviolet light, at least a second sensor 106, a drive system 108, a user interface 110, and/or a stop button 112. A controller (e.g., controller 114 shown in FIG. 10 and described below) may be communicatively coupled to the at least one first sensor 102, the light source 104, the at least one second sensor 106, the drive system 108, the user interface 110 and the stop button 112, may control the operations of the autonomous mobile device 100.

The at least one first sensor 102 (including sensors 102a, 102b shown in FIG. 9) may determine at least one of an orientation of the autonomous mobile device 100 (e.g., a direction that a front side and/or a first side of a robot is facing), a location of the autonomous mobile device 100 (e.g., a location of the autonomous mobile device 100 in an area), and/or when the light source 104 is within a predetermined distance of a surface and/or object in the area. In some implementations, the first sensor 102 may detect air, a surface, a reference tag, and/or objects that may be mapped by the autonomous mobile device 100 and/or disinfected with UV light from the light source 104.

In some implementations, the at least one first sensor 102 may have a field of view of 70 degrees diagonally. The at least one sensor 102 may have a detection distance of 0.2-4 meters. As shown in FIGS. 8-9, the at least one first sensor 102 may be disposed over the light source 104.

The at least one first sensor 102 may include a first side sensor disposed on a first side of the autonomous mobile device 100 and a second side sensor that may be disposed on a second side of the device. For example, as shown in FIG. 9, sensor 102a may be disposed on a first side (e.g., a front side) of the autonomous mobile device 100, and sensor 102b may be disposed on a second side (e.g., a back side) of the autonomous mobile device 100. Although sensors on two sides of the robot are shown in FIG. 9, there may be a plurality of sensors 102 disposed on different sides of the autonomous mobile device 100 to at least detect surfaces and/or objects. In some implementations, sensor 102a and/or sensor 102b may be disposed over the light source 104.

The light source 104 may be one or more bulbs, one or more lamps, and/or an array of light emitting diodes (LEDs) or organic light emitting diodes (OLEDs) to emit UV light (e.g., light having a wavelength of 10 nm-400 nm). The intensity (i.e., optical power output) may be controlled by the controller 114, which may also turn on or off a portion or all of the devices (e.g., bulbs, lamps, LEDs, OLEDs) of the light source 104.

The at least one second sensor 106 may be communicatively coupled to the controller 114 shown in FIG. 10, and may be used to detect air, surfaces, and/or objects that may be mapped and/or disinfected with UV light from the light source 104. In some implementations, the at least one second sensor 106 may determine at least one of an orientation of the autonomous mobile device 100 (e.g., a direction that a front side and/or a first side of a robot is facing), a location of the autonomous mobile device 100 (e.g., a location of the autonomous mobile device 100 in an area), and/or when the light source 104 is within a predetermined distance of a surface and/or object in the area.

In some implementations, the sensor 102, 106 may be a time-of-flight sensor, an ultrasonic sensor, a two-dimensional (2D) Light Detection and Ranging (LiDAR) sensor, a three-dimensional (3D) LiDAR sensor, and/or a radar (radio detection and ranging) sensor, a stereo vision sensor, 3D three camera, a structured light camera, or the like. The sensor 106 may have a field of view of 20-27 degrees. In some implementations, the sensor 106 may have a detection distance of 0.05-4 meters. The sensors 102, 106 may be used to detect objects, surfaces, people, animals, or the like.

The autonomous mobile device 100 may include a motor to drive the drive system 108 to move the autonomous mobile device in an area, such as a room, a building, or the like. The drive system 108 may include wheels, which may be adjustable so that the drive system 108 may control the direction of the autonomous mobile device 100.

In some implementations, the autonomous mobile device 100 may include a base with the drive system 108, and the sensor 102, 106 may be disposed on the base.

The controller 114 may control and/or operate the autonomous mobile device 100 in an operation mode which may be a manual mode, an autonomous mode, and/or a tele-operation mode. In the manual mode, the controller 114 may receive on or more control signals from the user interface 110 and/or the stop button 112. For example, a user may control the movement, direction, and/or stop the motion of the autonomous mobile device 100 by making one or more selections on the user interface 110. The stop button 112 may be an emergency stop (ESTOP) button which may stop all operations and/or movement of the autonomous mobile device 100 when selected. In some implementations, the controller 114 may receive at least one control signal via a network interface 116 (shown in FIG. 10) when operating when operating in the tele-operation mode. For example, the network interface may receive control signals via network 130 from server 140, database 150, and/or remote platform 160, as described below in connection with FIG. 11.

In some implementations, when the autonomous mobile device 100 is moving in a direction, the sensor 102, 106 may detect a geometry of one or more surfaces and/or objects. The output of the at least one first sensor 102 may be, for example, a point cloud of the one or more objects in the path of the autonomous mobile device 100. When the sensor 102 and/or sensor 106 is a stereo vision sensor, images from two sensors (i.e., where the two sensors may be part of the stereo vision sensor of the sensor 102 and/or sensor 106) within a known distance from one another distance may be captured at a predetermined point in time, and/or at predetermined time intervals with a global shutter. The global shutter may be configured so that the two sensors of the stereo vision sensor may capture images about simultaneously. One or more features may be determined from the captured images, and be compared to one another to determine portions that are matching. As the focal length of the two sensors of the stereo vision sensor and the distance between the two sensors (e.g., about 6 cm) may be stored in memory 118 and/or fixed storage 120 (shown in FIG. 10), the controller 114 and/or the at least one first sensor 102 may use the captured images and the stored values to determine the distance from the sensor 102, 106 to the surfaces and/or objects, and may be used by the controller for mapping. In some implementations, the sensor 102, 106 may include at least one laser, LED, and/or OLED, to radiate one or more points on surfaces of objects, when the objects may be without identifying features (e.g., blank walls).

When detecting the surface and/or object, the sensor 102, 106 may be a time-of-flight (TOF) sensor. At least one photon of light may be output by the sensor 102, 106, and may be transmitted through the air. When the at least one photon of light radiates surface and/or an object, a portion of the light may be reflected by the surface and/or the object may return to a receiver portion of the sensor 102, 106. The sensor 106 may calculate the time between sending the at least one photon of light and receiving the reflection, and multiply this value by the speed of light in air, to determine the distance between the sensor 102, 106 and surface and/or object. This may be used to generate the map of the area that the autonomous mobile device is operating within.

FIG. 10 shows example components of the autonomous mobile device 100 suitable for providing the implementations of the disclosed subject matter. The autonomous mobile device 100 may include a bus 122 which interconnects major components of the autonomous mobile device 100, such as the drive system 108, a network interface 116 operable to communicate with one or more remote devices via a suitable network connection, the controller 114, a memory 118 such as Random Access Memory (RAM), Read Only Memory (ROM), flash RAM, or the like, the stop button 112, the light source 104, the at least one first sensor 102, a user interface 110 that may include one or more controllers and associated user input devices such as a keyboard, touch screen, and the like, a fixed storage 120 such as a hard drive, flash storage, and the like, and the at least one second sensor 106.

The bus 122 allows data communication between the controller 114 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the autonomous mobile device 100 are generally stored on and accessed via a computer readable medium (e.g., fixed storage 120), such as a solid state drive, hard disk drive, an optical drive, solid state drive, or other storage medium.

The network interface 116 may provide a direct connection to a remote server (e.g., server 140, database 150, and/or remote platform 160 shown in FIG. 11) via a wired or wireless connection (e.g., network 130 shown in FIG. 11). The network interface 116 may provide such connection using any suitable technique and protocol as will be readily understood by one of skill in the art, including digital cellular telephone, WiFi, Bluetooth®, near-field, and the like. For example, the network interface 116 may allow the autonomous mobile device 100 to communicate with other computers via one or more local, wide-area, or other communication networks, as described in further detail below. The autonomous mobile device may transmit data via the network interface to the remote server that may include a path of operation, the surfaces and/or areas radiated with UV light, and the like.

Many other devices or components (not shown) may be connected in a similar manner. Conversely, all of the components shown in FIG. 10 need not be present to practice the present disclosure. The components can be interconnected in different ways from that shown. Code to implement the present disclosure can be stored in computer-readable storage media such as one or more of the memory 118, fixed storage 120, or on a remote storage location.

FIG. 11 shows an example network arrangement according to an implementation of the disclosed subject matter. Autonomous mobile device 100 described above, and/or a similar autonomous mobile device 200 may connect to other devices via network 130. The network 130 may be a local network, wide-area network, the Internet, or any other suitable communication network or networks, and may be implemented on any suitable platform including wired and/or wireless networks. The autonomous mobile device 100 and/or autonomous mobile device 200 may communicate with one another, and/or may communicate with one or more remote devices, such as server 140, database 150, and/or remote platform 160. The remote devices may be directly accessible by the autonomous mobile device 100, 200 or one or more other devices may provide intermediary access such as where a server 140 provides access to resources stored in a database 150. The autonomous mobile device 100, 200 may access remote platform 160 or services provided by remote platform 160 such as cloud computing arrangements and services. The remote platform 160 may include one or more servers 140 and/or databases 150.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as solid state drives, DVDs, CD-ROMs, hard drives, USB (universal serial bus) drives, or any other machine readable storage medium, such that when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing implementations of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may include using hardware that has a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   connecting, via a communications interface of an autonomous mobile device, to both a first communication network and a second communication network of a plurality of communication networks;
   connecting, via the communications interface, to a third communication network when the communications interface is disconnected from one of the first communications network and the second communications network;
   storing, at a memory device communicatively coupled to the communications interface, a map that includes a first one or more locations of the autonomous mobile device where the plurality of communications networks are accessible, and includes a second one or more locations of the autonomous mobile device where one or more of the plurality of communications networks have been disconnected; and
   at a different time, when the autonomous mobile device is within a predetermined distance of one of the second one or more locations that the plurality of communications networks have been disconnected, switching to the third communications network or another one of the plurality of communications networks based on the map and based on at least one signal from one or more sensors of the autonomous mobile device to determine a location of the autonomous mobile device.

2. The method of claim 1, further comprising:
   storing a disconnection point of one of at least one the first communications network and the second communications network on the map, and a connection point of the third communications network or the another one of the plurality of communications networks on the map.

3. The method of claim 1, further comprising:
   adjusting a rate of speed of the autonomous mobile device within the predetermined distance or within a switching area where the communications interface of the autonomous mobile device switches to the third communications network or the another one of the plurality of communications networks.

4. The method of claim 1, further comprising:
   controlling, at a controller of the autonomous mobile device, the movement of the mobile device according to the map.

5. The method of claim 1, further comprising:
   controlling the autonomous mobile device, at a controller, based on a signal received from the one or more sensors of the autonomous mobile device.

6. The method of claim 1, further comprising:
   transmitting data, at the communications interface, at a reduced rate when the communications interface is disconnected from at least one of the first communications network and the second communications network.

7. The method of claim 1, further comprising:
   configuring the communications interface of the autonomous mobile device to operate using a signal strength that is lower than a predetermined signal strength.

8. The method of claim 7, further comprising:
   dynamically reconfiguring the communications interface during one or more operations of the autonomous mobile device to use a signal strength that is lower than a predetermined signal strength.

9. The method of claim 1, further comprising:
   predicting, at a controller of the autonomous mobile device, a path of the autonomous mobile device based on previously received signals and a priority level of a mission of the autonomous mobile device; and
   predicting, at the controller, when to change from at least one of the first communications network and the second communications network to the third communications network or another one of the plurality of communications networks.

10. The method of claim 9, further comprising:
    connecting to a low priority network from among the plurality of communications networks based on the priority level of the mission of the autonomous mobile device, wherein the low priority network transmits data at a lower predetermined rate than other communications networks of the plurality of communications networks.

11. The method of claim 9, further comprising:
    connecting to a low priority network from among the plurality of communications networks based on operations of another autonomous mobile device, wherein the low priority network transmits data at a lower predetermined rate than other communications networks of the plurality of communications networks.

12. The method of claim 1, further comprising:
    operating the autonomous mobile device without signals received from the communications interface when the communications interface is disconnected from the plurality of communication networks.

13. The method of claim 1, further comprising:
    controlling, via a controller, a motion system of the autonomous mobile device to follow a person or object for a first predetermined period of time based on a signal received from the one or more sensors of the autonomous mobile device when the communications interface is disconnected from the plurality of communication networks.

14. The method of claim 13, further comprising:
outputting an indicator or message that the communications interface is disconnected from the plurality of communication networks after the first predetermined period of time.

15. The method of claim 13, further comprising:
controlling the motion system to the last place on the map where a connection with at least one of the plurality of communications networks was established when the communications interface is disconnected from the plurality of communication networks for a second predetermined period of time.

16. The method of claim 1, wherein the connecting further comprises:
connecting to one of the plurality of communications networks when one of the first communication networks or the second communication networks has a use rate that is greater than a predetermined use amount.

17. The method of claim 1, further comprising:
detecting, with the one or more sensors of the autonomous mobile device, whether another autonomous mobile device is within a predetermined distance;
determining that the autonomous mobile device and the other autonomous mobile device being connected to a same communications network of the plurality of communication networks exceeds a predetermined use amount; and
connecting the autonomous mobile device to a different one of the plurality of communications networks.

18. The method of claim 1, further comprising:
when the one or more sensor of the autonomous mobile device detects another autonomous mobile device within a predetermined distance, transmitting via the at least one of the plurality of communications networks at least a portion of the map to the other autonomous mobile device.

19. The method of claim 18, wherein the at least a portion of the map includes at least one selected from the group consisting of: geographical information, one or more areas that the plurality of communications networks have been disconnected, one or more areas where one or more of the plurality of communications networks have reduced bandwidth, and one or more areas where a rate of speed of the autonomous mobile device is to be adjusted.

20. The method of claim 1, further comprising:
receiving, via the communications interface, data from another autonomous mobile device to be added to the map when one or more sensors of the autonomous mobile device detects the other autonomous mobile device within a predetermined distance.

21. The method of claim 20, wherein the data includes at least one selected from the group consisting of: geographical information, one or more locations that the plurality of communications networks have been disconnected, one or more locations where one or more of the plurality of communications networks have reduced bandwidth, and one or more locations where a rate of speed of the autonomous mobile device is to be adjusted.

22. The method of claim 1, wherein the switching to the third communications network or another one of the plurality of communications networks further comprises:
selecting one of the third communications network or another one of the plurality of communications networks is based on an available duration of signal time, regardless of signal strength.

23. The method of claim 22, wherein the selecting the one of the third communications network or another one of the plurality of communications networks is based on minimizing the switching between the plurality of communication networks.

24. The method of claim 1, wherein the switching further comprises:
switching to the third communications network or the other one of the plurality of communications networks that provide a longer connection time based on a planned path of the autonomous mobile device.

25. The method of claim 24, further comprising:
predicting, at a controller of the autonomous mobile device, the planned path based on a user of the autonomous mobile device.

26. The method of claim 1, further comprising:
switching to the third communications network or another one of the plurality of communications networks when one of the first communication network and the second communication network has a network load that is greater than a predetermined threshold network load.

27. The method of claim 1, further comprising:
switching to a low priority network from among the plurality of communications networks based on a classification of the autonomous mobile device, wherein the low priority network transmits data at a lower predetermined rate than other communications networks of the plurality of communications networks.

28. The method of claim 1, further comprising:
reducing a bandwidth for the autonomous mobile device for at least one selected from the group consisting of: the first communication network, the second communication network, and the third communication network that the autonomous mobile device is connected based on the use of at least one of the first communication network, the second communication network, and the third communication network by other devices.

29. The method of claim 1, further comprising:
switching to at least one selected from the group consisting of: the first communication network, the second communication network, and the third communication network when a network that the autonomous mobile device is connected to has a predetermined usage by other devices.

30. The method of claim 29, further comprising:
dynamically changing a route of the autonomous mobile device based on a change to the map for a connectivity for one of the plurality of communication networks.

* * * * *